United States Patent
Chen

(10) Patent No.: US 8,199,618 B2
(45) Date of Patent: Jun. 12, 2012

(54) BUFFER CONTROL SYSTEM FOR REDUCING BUFFER DELAY TIME BETWEEN THE PLAYBACK OF TRACKS AND METHOD THEREOF

(75) Inventor: Yeow-Chyi Chen, Taipei County (TW)

(73) Assignee: MediaTek Inc., Science-Based Industrial Park, Hsin-Chu Hsien (TW)

( * ) Notice: Subject to any disclaimer, the term of this patent is extended or adjusted under 35 U.S.C. 154(b) by 1581 days.

(21) Appl. No.: 11/307,779

(22) Filed: Feb. 22, 2006

(65) Prior Publication Data

US 2007/0195654 A1   Aug. 23, 2007

(51) Int. Cl.
*G11B 7/00* (2006.01)

(52) U.S. Cl. .............. 369/47.31; 369/47.32; 369/47.33; 369/47.47

(58) Field of Classification Search ............. 369/47.47, 369/47.32, 47.31, 47.33
See application file for complete search history.

(56) References Cited

U.S. PATENT DOCUMENTS

| | | | |
|---|---|---|---|
| 7,312,390 B2 * | 12/2007 | Yanagawa et al. | 84/615 |
| 2003/0210617 A1 * | 11/2003 | Millikan et al. | 369/30.23 |
| 2004/0202073 A1 * | 10/2004 | Lai et al. | 369/47.33 |
| 2005/0157622 A1 * | 7/2005 | Ueki | 369/53.31 |

FOREIGN PATENT DOCUMENTS

CN      1696891 A      11/2005

* cited by examiner

*Primary Examiner* — Lixi C Simpson
(74) *Attorney, Agent, or Firm* — Winston Hsu; Scott Margo

(57) ABSTRACT

A buffer control system for generating a buffered signal having reduced buffer delay time between playback of tracks includes a controller module for providing an end target and for selection of a servo data signal corresponding to a desired track; a compare circuit coupled to the servo data signal for comparing a timestamp of the servo data signal to the end target, and asserting an end match signal when the timestamp of the servo data signal matches the end target; and a data buffering unit for storing the servo data signal as stored data to fill a capacity of an internal memory, and streaming out the buffered signal from the stored data in the internal memory when the capacity has reached a predetermined level; wherein the controller module is for updating selection of the servo data signal according to a next desired track upon assertion of the end match signal.

20 Claims, 5 Drawing Sheets

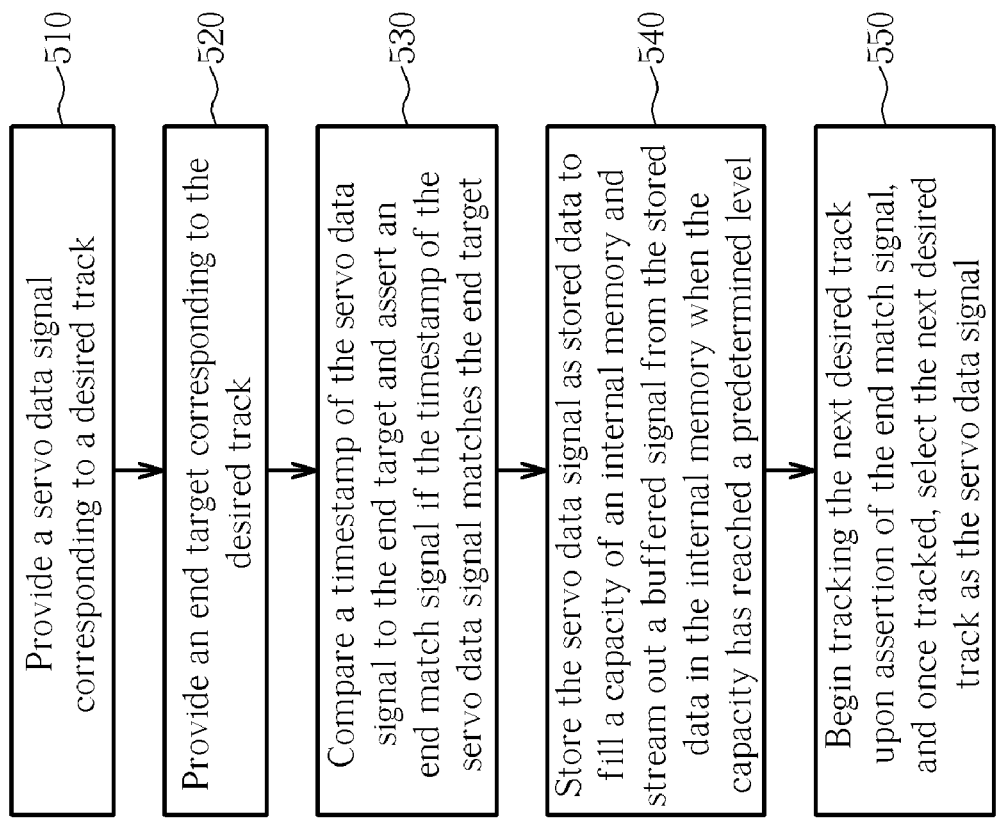

BUFFER CONTROL SYSTEM FOR REDUCING BUFFER DELAY TIME BETWEEN THE PLAYBACK OF TRACKS AND METHOD THEREOF

BACKGROUND OF THE INVENTION

1. Field of the Invention

The present invention relates to optical media players, and more particularly, to a buffer control system for reducing a buffer delay time occurring between the playback of tracks.

2. Description of the Prior Art

Optical media players continually rank amongst the more popular consumer electronics devices for audio/visual enthusiasts. The availability of various types of music and data formats provides a wide array of choices for a consumer to select from. Some of the more popular media player types include CD disc players, VCD players, DVD players, and MP3 audio players from solid state memory or CD disc format.

One of the key features inherent in media players of these types is the ability to immediately select and play specific songs or segments. The data located in the storage medium is separated into tracks, with each individual track corresponding to a specific song or section. Tracks are further spaced with lead-in areas, preventing data overlap between adjacent tracks. Identification of each song is conveyed through a start target and end target for each track. This allows the processor to identify where on the storage medium the specific data content exists, and more particularly where the specific track data begins and ends. In essence, the start and end targets provide an index for a processor to pinpoint a specific track locations.

During playback of an audio track, the audio device will continually compare the current track time of playback, or timestamp, with the start target of the current track to provide a reference of the current timestamp with relation to critical track targets. This will also determine when playback of the current track has finished. This procedure is known as track targeting. Once the track target has been reached, the device can begin to locate and buffer the next upcoming track.

Before buffering of a new track can commence, the timestamp of the input signal must math the start target of the track. The use of a buffer acts to store in advance the audio data onto a solid state memory format before it is played. Since the process of retrieving data from solid state memory is robust and less susceptible to small shocks and impacts, it is able to play audio data without skipping. Track targeting therefore is necessary for buffering, as it provides a time reference of the buffered data, and can help determine when to begin and end the buffering process.

FIG. 1 illustrates a buffer control system according to the related art. A typical targeting circuit 100 comprises a firmware controller 110, a data buffering unit 120, and a compare circuit 130. The firmware controller 110 manages the bulk of the targeting process through its firmware protocol, as will be further described below. The audio input, or servo data 101 is sent from the optical disc and accepted by the data buffering unit 120. The servo data 101 corresponds to a specific track from the optical disc for playback, controlled by the firmware controller 110 (not shown). The servo data 101 can therefore also consist of a programmed playlist from the user, a randomized playlist, or a user selection input to the firmware controller 110. The data buffering unit 120 fills the servo data 101 data into its internal memory up to a predetermined capacity, before streaming the stored data to the next component as buffered data. The streaming buffered data (or buffered output) is then passed on to other components (not shown) of the audio system for playback. This may comprise components for amplification, signal processing, equalization, and audio formatting. The data buffering unit 120 also sends a timestamp of the buffered data to the compare circuit 130 and the firmware controller 110 for tracking.

The compare circuit 130 acts to compare the timestamp of the buffered data with the start target provided by the firmware controller 110. Once the start target has been reached (ie. the buffered data has reached the start of the desired track), a match signal is sent to the data buffering unit 120, and to the firmware controller 110. The match signal signifies to the data buffering unit 120 to begin the buffering process described above to prevent skips from small shocks. The match signal further signifies the firmware controller 110 to begin the targeting process. The firmware controller 110 then begins to compare the end target of the track to the timestamp of the buffered data until it determines a match. It is fully consumed with this process until a match is determined, from which the firmware controller 110 can then begin to target the next track for playback (not shown).

The firmware controller 110 thus can only begin to target the next track upon confirmation of an end target match of the buffered data. Because the data buffering unit 120 becomes fully purged and empty when the end target match has been reached, it must refill itself to capacity with the servo data of the newly targeted track before it can begin outputting the buffered data of the next track. The data buffering unit 120 also cannot begin the buffering of a new track until after the start target of the new track has been acquired. These factors result in a buffer delay experienced between the playback of different tracks.

The buffer delay is further explained through a timeline of the buffering process 200 as illustrated in FIG. 2. This chart simultaneously illustrates the playback data (buffered data) and servo data (input data) as a function of time. As Song 1 from the servo data is sent to the buffer at time interval 0, it begins buffering this data by storing it into memory. Playback (buffered data output) does not begin until an internal buffer capacity has been reached, resulting in a buffer delay 210 before streaming playback can start. At time interval 1, a predetermined buffer capacity will have been reached, and playback of a buffered Song 1 will begin. The firmware controller will now begin the end targeting process, as a start target match would have been detected and sent to the firmware controller. From this point on, the firmware controller will be preoccupied with monitoring the timestamp of the buffered output until it matches the end target, and the data buffering unit will continue buffering the selected track data until it receives an end match signal from the firmware controller signify the stoppage of buffering.

At time interval 3, input from the selected track data (Song 1) will have ended, however, the playback of this track will continue until the buffer has fully purged the song through its streaming output. This delay is called the purging delay 220 of the selected track data. The firmware controller is still preoccupied with targeting the buffered data, as the timestamp matching the end target will not have approached yet. Therefore, the firmware controller cannot target the start target for the next song, until it receives an end target match for the current song.

Once purging of the current track has completed at time 4, the track end target will have been reached at the buffered data output. At this point, the firmware controller will have determined and end target match, and can thus begin acquiring the next track (Song 2). This process includes determining a new start target for the next track, sending the new start target to the compare circuit 130, and tracking the new track. Another buffer delay time 210 will pass to allow for the firmware controller to accomplish this, and allow for the data buffering unit to fill the selected track data from the new track to a set capacity of its memory. Playback output of the next song does not begin until the buffer capacity has been reached at time 5, at which point the start target of this new song will be matched, allowing the firmware controller to switch back to tracking the end target of this new track.

SUMMARY OF THE INVENTION

A goal of the present invention is to reduce the buffer delay time between the playback of tracks for an optical media player, while reducing its required firmware efforts. This goal is accomplished by acquiring the next track for playback prior to the purging of the buffer memory. In this manner, the audio player does not need to wait for the current song to reach its end target before the next song is acquired. The next song can be targeted in advance, and begin to be buffered simultaneously as the current song data is being purged. This will result in a seamless transition between the playback of different tracks, as it will reduce or eliminate the buffer delay time. In order to accomplish this, according to one exemplary embodiment, firmware resources are relieved, as the firmware controller cannot simultaneously target a current song while acquiring an upcoming track. By moving the target matching process into the hardware side of device operation, the firmware requirements are reduced because the firmware controller only needs to focus on the acquisition of an upcoming track.

According to an exemplary embodiment of the present invention, a buffer control system for generating a buffered signal having a reduced buffer delay time between playback of tracks is disclosed. The buffer control system includes a controller module for providing an end target, and further for selection of a servo data signal corresponding to a desired track; a compare circuit coupled to the servo data signal for comparing a timestamp of the servo data signal to the end target, and asserting an end match signal when the timestamp of the servo data signal matches the end target; and a data buffering unit for storing the servo data signal as stored data to fill a capacity of an internal memory, and streaming out the buffered signal from the stored data in the internal memory when the capacity has reached a predetermined level; wherein the controller module is further for updating the selection of the servo data signal according to a next desired track upon assertion of the end match signal.

According to another exemplary embodiment of the present invention, a method for generating a buffered signal having a reduced buffer delay time between playback of tracks is also disclosed. The method comprises generating an end target according to a desired track; reading a servo data signal corresponding to the desired track; comparing a timestamp of the servo data signal to the end target; asserting an end match signal when the timestamp of the servo data signal matches the end target; storing the servo data signal as stored data to fill a capacity of an internal memory; streaming out the buffered signal from the stored data in the internal memory when the capacity has reached a predetermined level; and selecting a next desired track upon assertion of the end match signal.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 is a flowchart illustrating a method for reducing buffer delay time between the playback of tracks according to an exemplary embodiment of the present invention.

DETAILED DESCRIPTION

Figure 1:
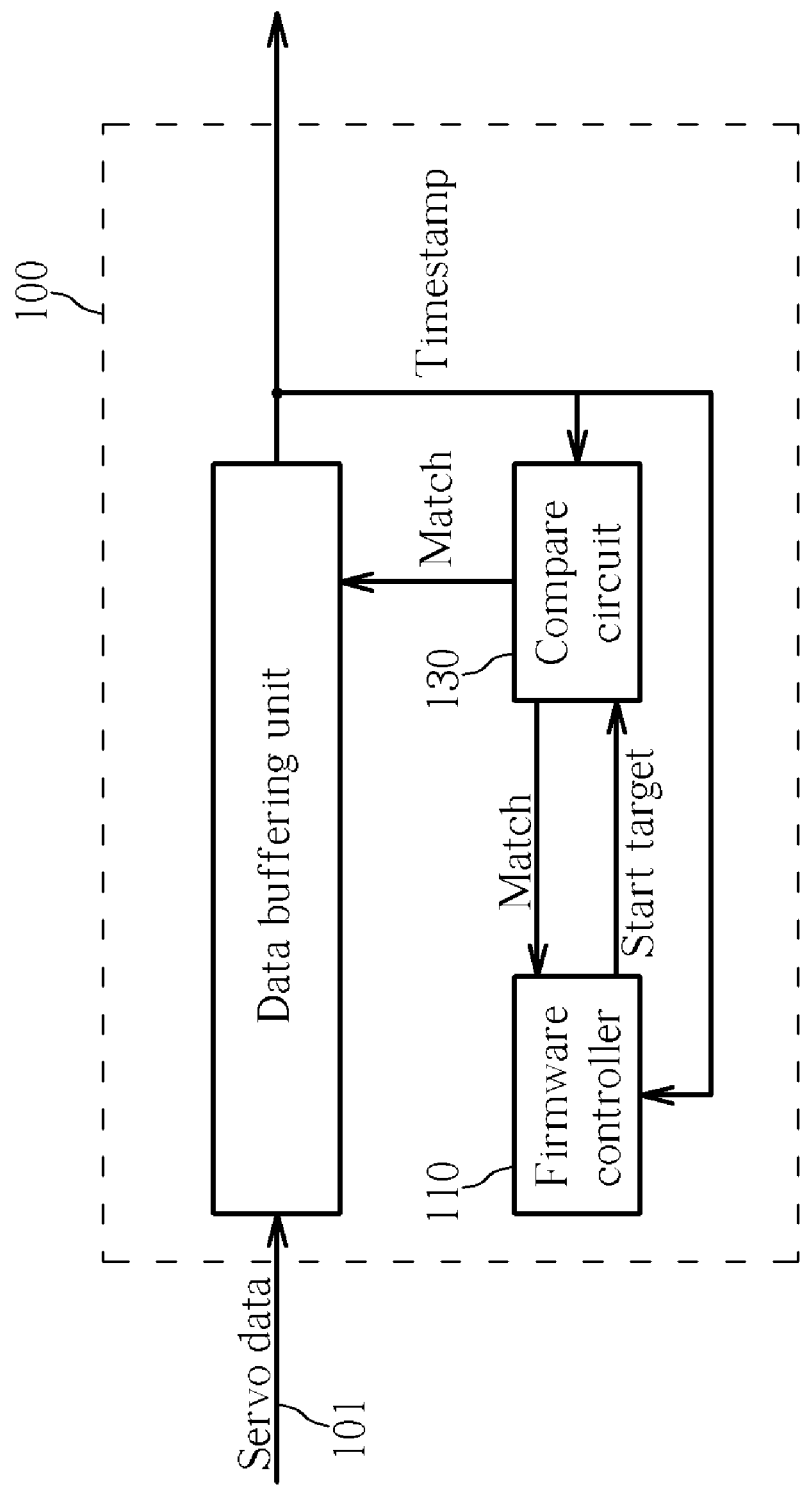
FIG. 1 is a typical buffer control system according to the related art.
Figure 2:
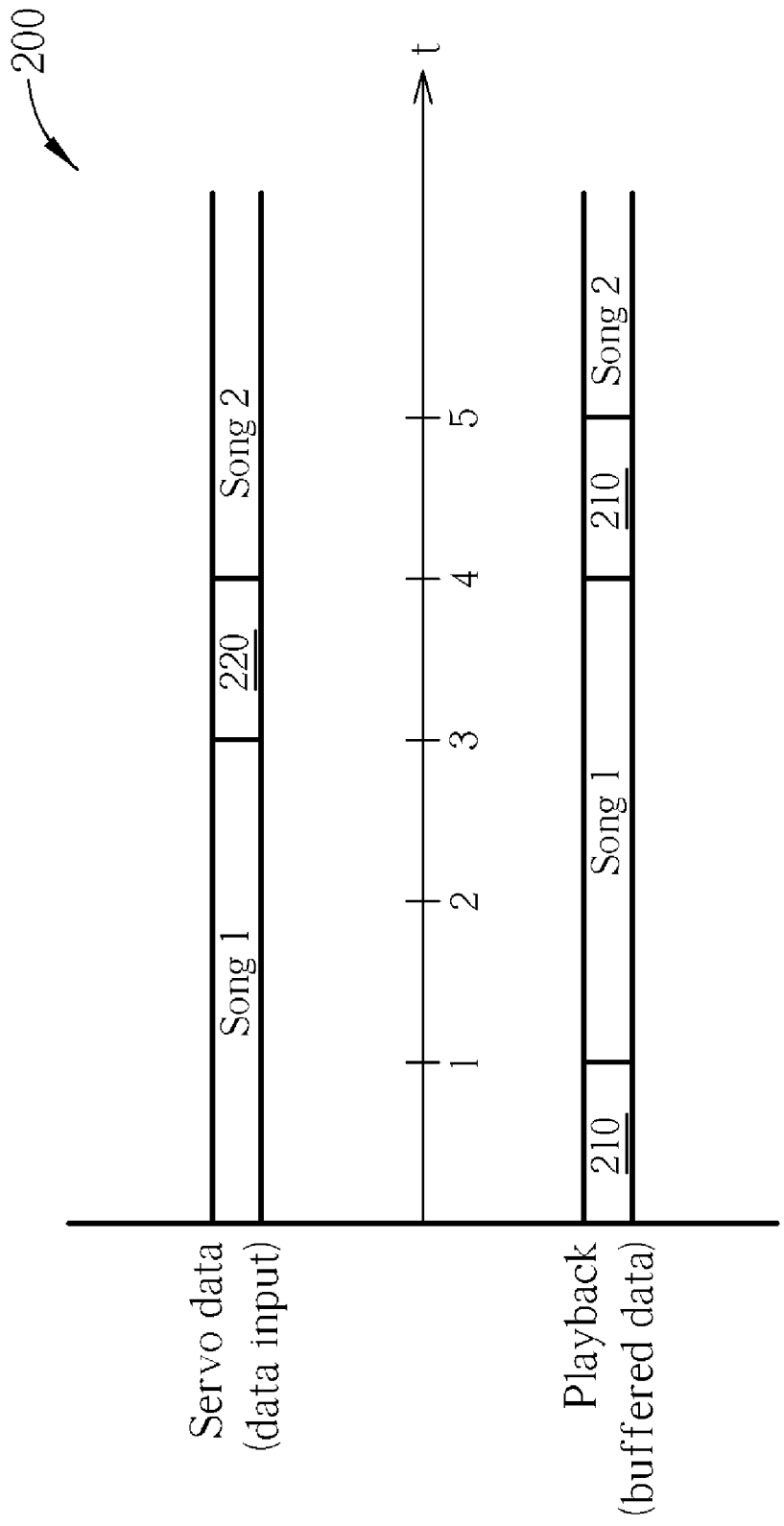
FIG. 2 is a timing diagram of the buffered data and selected track data to illustrate the buffering process of FIG. 1.

Because the related art firmware controller of the audio player in FIG. 1 handles both the end targeting process and the acquisition of upcoming tracks, it must wait for the completion of one process before it can begin the other. Current methods do not allow for the simultaneous operation of both processes by the firmware controller. The related art method burdens the firmware controller resources, and prohibits the firmware controller from acquiring the next track target at an earlier time, such as during the end targeting process. Invariably, this results in the buffer delay 210 experienced between the playback of tracks as described above.

Figure 3:
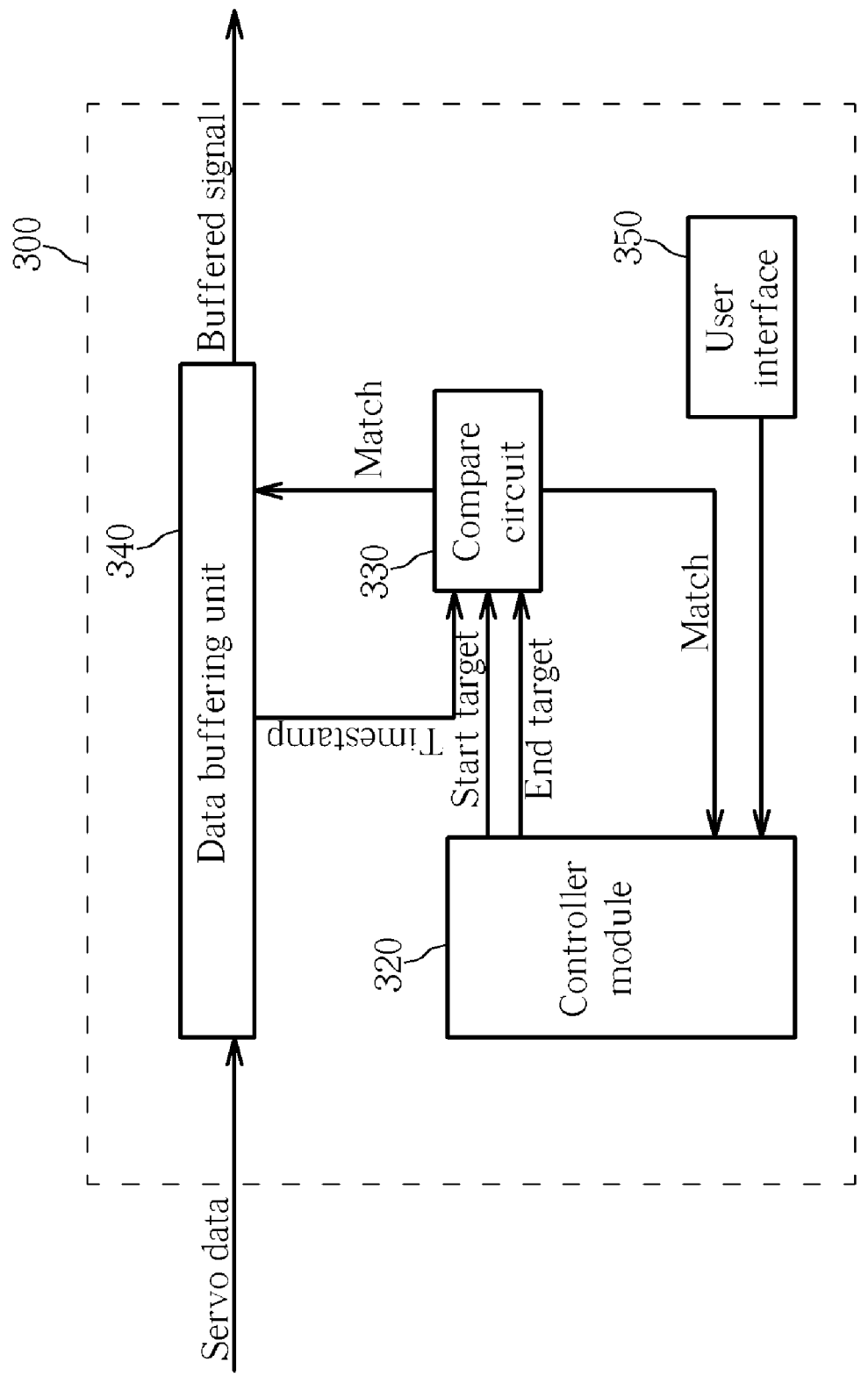
FIG. 3 is a diagram of a buffer control system for reducing buffer delay time between the playback of tracks according to a first exemplary embodiment of the present invention.

FIG. 3 is a diagram of a buffer control system for reducing buffer delay time between the playback of tracks according to a first exemplary embodiment of the present invention. The buffer control system 300 comprises a controller module 320, a compare circuit 330, a data buffering unit 340, and a user interface 350.

Operation of the buffer control system 300 is described as follows. Servo data is read from a component of the media player (not shown), such as a pickup head or a sensory device. The source that forms the input data signal can be from an optical disc or any type of media disc. The specific track generated as the servo data is produced in accordance to the controller module 320, and can be random, from a playlist, or user initiated through the user interface 350. For example, in one embodiment, the controller module 320 controls an optical pickup head to a position on an optical disc in order to select a specific track on the optical disc to be read as servo data corresponding to the selected track according to a user selection.

The servo data signal controlled by the controller module 320 is then sent to the data buffering unit 340. As described earlier, the data buffering unit 340 fills the servo data into an internal memory to reach a predetermined capacity. Once this capacity has been reached, it begins streaming the stored data as a buffered signal output. The buffered signal can then be passed onto other components (not shown) of the media system for further processing or playback to the user. As previously described, the use of a buffer acts to store in advance data onto a solid state memory format before it is played. This makes playback less susceptible to small shocks and impacts as compared to direct playback from an optical medium. The buffering process begins when the data buffering unit 340 receives a start target match, and continues to buffer the input data until an end target match has been received. The end target match signifies that a track end target has been reached, and that buffering of the input data can cease. The start target match signal, and the end target match signal can consist of two separate signal lines, or can be time division multiplexed onto a single match signal line as shown in FIG. 3.

The compare circuit 330 is used to generate the start match signal and end match signal referred to earlier. The compare circuit 330 compares a timestamp of the servo data signal to the end target or to the start target of the current track, and asserts a corresponding match signal if the timestamp matches the selected track target. The start target and end target are both sent to the compare circuit 330 from the controller module 320. Only one of either the start target or end target is selected at a time by the compare circuit to compare to the timestamp of the input data. If the timestamp of the input data signal matches the start target, then a start match signal is asserted. Conversely, if the timestamp of the input data signal matches the end target, an end match signal is asserted. The start match signal is sent to the data buffering unit 340 to begin the buffering process for the input data. The end match signal is also sent to the data buffering unit 340 to stop the buffering process, and is further sent to the controller module to begin targeting the next desired track.

The controller module 320 acts to produce the appropriate start and end targets for the compare circuit 330, and to control track selection to playback a desired track. The current end target is sent to the compare circuit 330 for comparison until an end match signal has been asserted. The assertion of the end match signal indicates that the timestamp of the input data has reached the end target, and as such, the next desired track needs to be targeted. The controller module 320 will then act to update the end target based on the next desired track, and select the next track for playback. When receiving a start match signal, the controller module 320 will act to update the start target according to the next desired track. The updating of the start target for the next desired track can be performed within a period starting from assertion of the start match signal to the assertion of the end match signal of a current track. As described previously, the start target match signal and the end target match signal can consist of two separate signal lines, or can be time division multiplexed onto a single match signal line as shown in FIG. 3.

Figure 4:
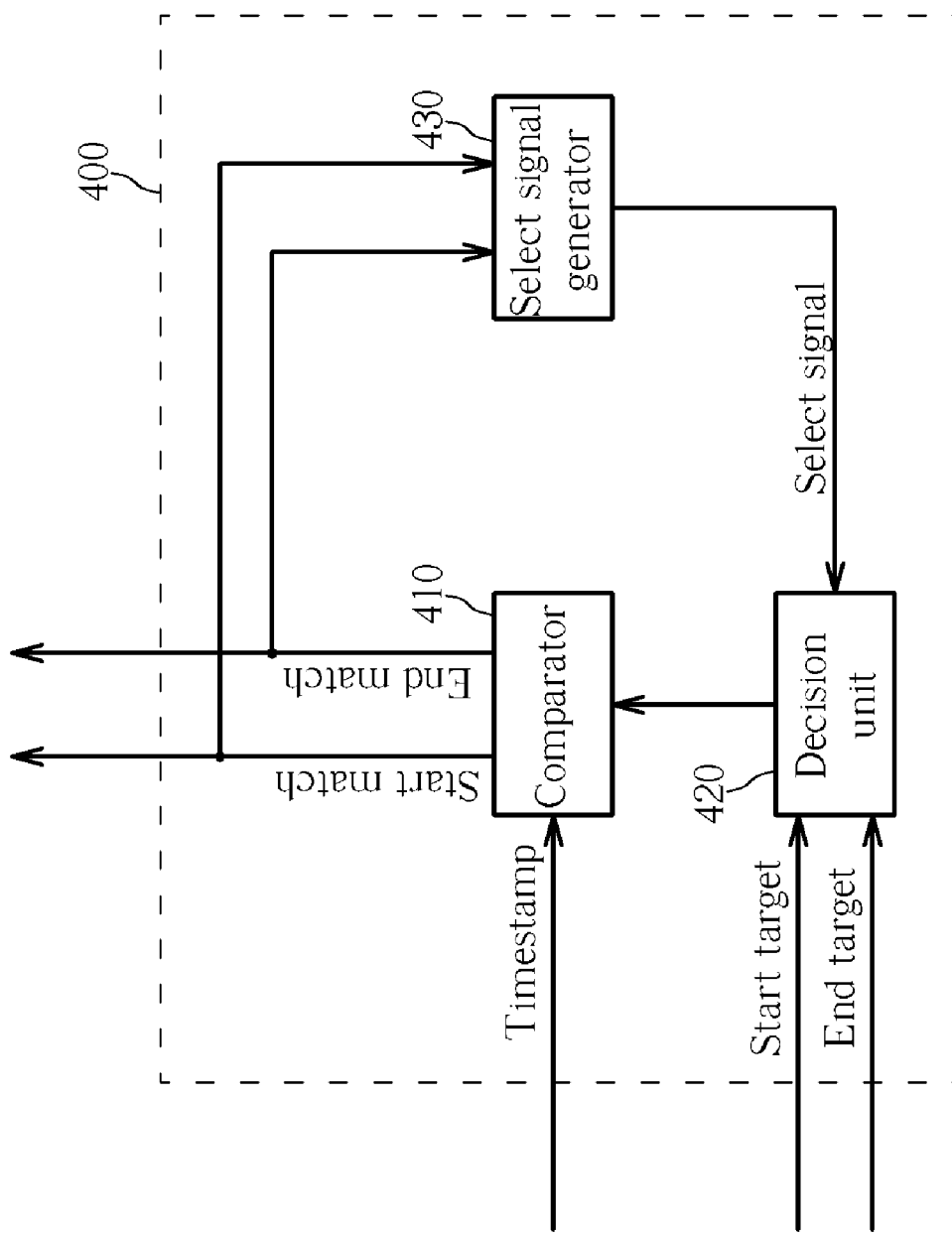
FIG. 4 is an embodiment of the compare control circuit of FIG. 3.

An embodiment detailing the composition of the compare control circuit 330 is illustrated in FIG. 4. In this embodiment, the compare control circuit 400 comprises a comparator 410, a decision unit 420, and a select signal generator 430. The decision unit 420 acts to select one of either the start target or the end target to send to the comparator 410 as a target signal for use as a reference for comparison. The specific selection of the target signal is based on a select signal. The comparator 410 then takes the decision unit 420 output and compares this to the timestamp of the input data. If the timestamp of the input data signal matches the start target when the start target is selected by the decision unit 420, then a start match signal is asserted. Otherwise, if the timestamp of the input data signal matches the end target when the end target is selected by the decision unit 420, an end match signal is asserted. The select signal used to select either the start target or end target as the target signal from the decision unit 420, is generated through the select signal generator 430. The select signal is time division multiplexed to correspond to one of the start target or end target at a given time. When tracking for the start of a track, the start target is selected. Once the start match signal is asserted, the select signal generator 430 then toggles the select signal to procure selection of the end target by the decision unit 420. End target tracking can thus begin. Once tracking for end target has completed and the end match signal asserted, the select signal generator 430 again toggles the select signal to select the start target as the target signal. In essence, the select signal generator 430 acts to toggle the select signal each time the end match signal or the start match signal is asserted such that the appropriate target signal is selected for the chosen tracking process.

A user interface 350 can be further implemented in order for a user to input desired tracks for playback. A user can thus individually enter desired tracks for playback, or compile a playlist for a playback order of tracks through the user interface 350. This information is then conveyed to the controller module 320 to determine a next desired track upon the assertion of an end match signal. The user can also interrupt the current playback by input through the user interface 350 in order to configure the media player to play an alternative track, or cease playback, or perform other potential media device functions.

A flow chart illustrating a method for generating a buffered signal having a reduced buffer delay time between playback of tracks 500 according to an exemplary embodiment of the present invention is shown below. Provided that substantially the same result is achieved, the steps of process 500 need not be in the exact order shown and need not be contiguous, that is, other steps can be intermediate. The method comprises:

Step 510: Provide a servo data signal corresponding to a desired track.

Step 520: Provide an end target corresponding to the desired track.

Step 530: Compare a timestamp of the servo data signal to the end target and assert an end match signal if the timestamp of the servo data signal matches the end target.

Step 540: Store the servo data signal as stored data to fill a capacity of an internal memory and stream out a buffered signal from the stored data in the internal memory when the capacity has reached a predetermined level.

Step 550: Begin tracking the next desired track upon assertion of the end match signal, and once tracked, select the next desired track as the servo data signal.

The present invention therefore provides a buffer control system for reducing buffer delay time between the playback of tracks. This is accomplished in large part by allocating certain firmware processes of the controller module into hardware components, and further by monitoring the timestamp of the servo data signal to determine a match to critical end targets. Because the firmware process of the controller module is not preoccupied with the end target matching process, the firmware routine can be utilized to locate and track an upcoming desired track. Once an end match signal is asserted by the compare circuit, the controller module is thus ready to update the track selection signal and end target according to the next desired track. Furthermore, because the timestamp of the input data is used for comparison with the start and end targets as opposed to the buffer output, the input data of a next desired track can be sent to the data buffering unit immediately after an end target match has been determined. This greatly reduces the otherwise prevalent buffer delay, as data from the new track is concurrently inputted to the data buffering unit while data from the old track is being streamed out (or purged out). In this manner, buffer delay time between the playback of tracks is minimized, allowing for a smooth uninterrupted playback for a media device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A buffer control system for generating a buffered signal having a reduced buffer delay time between playback of tracks, the buffer control system comprising:
   a controller module for providing an end target according to a desired track, and further for selecting and reading a servo data signal corresponding to the desired track, and for updating the selection of the servo data signal according to a next desired track upon assertion of an end match signal;
   a compare circuit coupled to the servo data signal and the controller module, for comparing a timestamp of the servo data signal to the end target, and asserting the end match signal when the timestamp of the servo data signal matches the end target; and
   a data buffering unit coupled to the servo data signal and the compare module, for storing the servo data signal as stored data to fill a capacity of an internal memory while the compare circuit simultaneously compares the timestamp of the servo data signal to the end target regardless of a current capacity of the internal memory, and streaming out the buffered signal from the stored data in the internal memory when the capacity has reached a predetermined level.

2. The system of claim 1, wherein the servo data signal selected by the controller module is data from a particular track of a media disc, the end target specifies a timestamp of where the particular track ends on the media disc.

3. The system of claim 1, wherein the controller module is further for updating the end target according to the next desired track upon assertion of the end match signal.

4. The system of claim 1, wherein the controller module is further for providing a start target according to the desired track; the compare circuit for comparing the timestamp of the servo data signal to the start target, and asserting a start match signal when the timestamp of the servo data signal matches the start target; and the data buffering unit for beginning to store the servo data signal in the internal memory upon assertion of the start match signal.

5. The system of claim 4, wherein the data buffering unit is further for stopping the storing of the servo data signal in the internal memory upon assertion of the end match signal.

6. The system of claim 4, wherein the controller module is further for updating the start target according to the next desired track within a period starting from assertion of the start match signal to assertion of the end match signal.

7. The system of claim 4, wherein the compare circuit comprises:
   a decision unit coupled to the controller module for selecting one of the start target or the end target as a target signal; and
   a comparator coupled to the decision unit for asserting the end match signal when the target signal matches the timestamp of the servo data signal while the decision unit is selecting the end target as the target signal, and for asserting the start match signal when the target signal matches the timestamp of the servo data signal while the decision unit is selecting the start target as the target signal.

8. The system of claim 7, wherein the compare circuit further comprises a select signal generator for toggling a select signal each time the end match signal or the start match signal is asserted; and the decision unit being coupled to the select signal generator further for selecting one of the start target or the end target as the target signal according to the select signal.

9. The system of claim 1, wherein the servo data signal selected by the controller module corresponds to data read from an optical disc, and the controller module is further for selecting the desired track from the optical disc.

10. The system of claim 1, further comprising a user interface coupled to the controller module, wherein the next desired track is determined from a playback order specified by a user through the user interface.

11. A method for generating a buffered signal having a reduced buffer delay time between playback of tracks, the method comprising:
   generating an end target according to a desired track;
   reading a servo data signal corresponding to the desired track;
   storing the servo data signal as stored data to fill a capacity of an internal memory and simultaneously comparing a timestamp of the servo data signal to the end target regardless of a current capacity of the internal memory;
   asserting an end match signal when the timestamp of the servo data signal matches the end target;
   reading a servo signal of a next desired track upon assertion of the end match signal and generating a next end target according to the next desired track; and
   streaming out the buffered signal from the stored data in the internal memory when the capacity has reached a predetermined level.

12. The method of claim 11, wherein the servo data signal is data from a particular track of a media disc, the end target specifies a timestamp of where the particular track ends on the media disc.

13. The method of claim 11, further comprising updating the end target according to the next desired track upon assertion of the end match signal.

14. The method of claim 11, further comprising:
   generating a start target according to the desired track;
   comparing the timestamp of the servo data signal to the start target;
   asserting a start match signal when the timestamp of the servo data signal matches the start target; and
   beginning to store the servo data signal in the internal memory upon assertion of the start match signal.

15. The method of claim 14, further comprising stopping the storing of the servo data signal in the internal memory upon assertion of the end match signal.

16. The method of claim 14, further comprising updating the start target according to the next desired track within a period starting from assertion of the start match signal to assertion of the end match signal.

17. The method of claim 14, further comprising:
   selecting one of the start target or the end target as a target signal;
   asserting the end match signal when the target signal matches the timestamp of the servo data signal and the end target is selected as the target signal; and
   asserting the start match signal when the target signal matches the timestamp of the servo data signal and the start target is selected as the target signal.

18. The method of claim 17, further comprising toggling a select signal each time the end match signal or the start match signal is asserted; and selecting one of the start target or the end target as the target signal according to the select signal.

19. The method of claim 11, wherein the servo data signal corresponds to data read from an optical disc.

20. The method of claim 11, further comprising determining the next desired track from a playback order specified by a user through a user interface.

* * * * *